United States Patent [19]
Kalebjian et al.

[11] Patent Number: 5,797,589
[45] Date of Patent: Aug. 25, 1998

[54] THROTTLE BODY WITH CAPTURED BEARINGS

[75] Inventors: Christopher Joseph Kalebjian, Belleville; Stephen Joseph Hamby, Redford; Wade Coots, Livonia, all of Mich.

[73] Assignee: Ford Motor Company, Dearborn, Mich.

[21] Appl. No.: 890,538

[22] Filed: Jul. 9, 1997

[51] Int. Cl.$^6$ ........................................... F16K 1/22
[52] U.S. Cl. .................................. 251/305; 123/337
[58] Field of Search ........................ 251/305; 123/337

[56] References Cited

U.S. PATENT DOCUMENTS

| | | |
|---|---|---|
| 4,125,298 | 11/1978 | Heurich et al. |
| 4,193,948 | 3/1980 | Charmley et al. |
| 4,561,158 | 12/1985 | Johnson et al. |
| 4,611,933 | 9/1986 | Hofmann et al. |
| 4,938,452 | 7/1990 | Imamura et al. |
| 5,414,784 | 5/1995 | Schulte et al. |
| 5,678,594 | 10/1997 | Hill ........................ 251/305 |

FOREIGN PATENT DOCUMENTS 0 418 526 A2  3/1991  European Pat. Off.

*Primary Examiner*—John Fox
*Attorney, Agent, or Firm*—Donald A. Wilkinson

[57] ABSTRACT

A throttle body (12), for an air intake system of a vehicle, including a housing (14) formed of a thermoplastic material and including a pair of throttle shaft bearing pockets (24, 26) extending from a main bore (16) of the throttle body. The bearing pockets (24, 26) each include a generally cylindrical wall (34) of a diameter to allow for a press fit of throttle shaft support bearings (28, 30) therein. After insertion, a swaging process secures the bearings (28, 30) into the pockets (24, 26) by forming lips (40) around the bearings. The walls (34) may include axial grooves (36) to allow for a more controlled swaging operation.

8 Claims, 2 Drawing Sheets

1

THROTTLE BODY WITH CAPTURED BEARINGS

FIELD OF THE INVENTION

The present invention relates to a throttle body employed with an internal combustion engine, and more particularly to a throttle body having a plastic main housing.

BACKGROUND OF THE INVENTION

A conventional air induction throttle consists of many discrete components, each providing a discrete function. For example, throttle shaft bearings generally support a throttle shaft in a metal throttle body housing. The purpose of the throttle shaft bearings is to minimize the friction between the shaft and housing, and to virtually eliminate throttle shaft icing concerns.

Advancements in plastic molding technology and material properties make it possible to produce complex plastic engine components that are able to withstand the harsh underhood environment of a vehicle while minimizing the number of parts and assembly costs. Thus, some are looking to a plastic throttle body. While this application of plastic composites has several advantages, namely weight and complexity reduction, it can pose a potential concern. For metal housings, common bearings used for supporting the throttle shaft are press fit into place, however, in plastic, long term effects of pressed-in inserts can arise as they relate to the influence of material creep. This is so because plastic has a tendency to relax over time when an object is force fit into it. The result is that over time, dimensions in the bearing pockets relax and cause a reduction in press forces retaining the bearings in the housing. Consequently, the conventional method used with metal throttle bodies is generally inadequate.

The need arises then, to provide an alternative to pressed-in bearings, which will secure the bearings in the housing without material creep or other concerns arising while still minimizing the cost and complexity of the throttle body assembly.

SUMMARY OF THE INVENTION

In its embodiments, the present invention contemplates a throttle body including a housing, formed of a thermoplastic type of material, including a main wall defining a main bore therethrough and a pair of bosses extending from the main wall and defining a throughbore therethrough. The bosses each include a bearing pocket adjacent the throughbore defined by a generally cylindrical pocket wall and a stop member extending radially inward into the corresponding pocket. The throttle body also includes a pair of bearings having generally cylindrical outer surfaces, one each mounted in a respective one of the bearing packets and abutting a respective one of the stop members. Further, each of the pockets includes retention lips extending from and being integral with the wall about a portion of the respective bearing opposite the side of the bearing abutting the stop member.

The present invention further contemplates a method of securing a throttle shaft bearing in a thermoplastic throttle body housing comprising the steps of: providing a bearing pocket integral with the housing and including a generally cylindrical pocket wall of a given nominal diameter and a stop member; providing a bearing having a generally cylindrical outer surface of a nominal diameter; inserting the bearing into the pocket with the outer surface generally concentric with the pocket wall until the bearing abuts the stop member; and plastically deforming the material of the pocket wall about a portion of the bearing on a side opposite the stop member until a lip is formed whereby the bearing is retained in the pocket by the lip.

Accordingly, an object of the present invention is to securely capture the throttle bearings within the plastic throttle body housing without any additional fasteners, retaining devices or machining operations, which can substantially increase the cost and complexity of the throttle body assembly.

An advantage of the present invention is that the swaging of the shaft bearings in the plastic throttle body housing provides positive bearing retention for the life of the throttle body.

A further advantage of the present invention is that it increases the forces required to force the bearing out of the pockets (push out force) and increases the service life by eliminating the possible adverse effects of long term fatigue, creep, etc., while still producing a tight, well located finished assembly with low cost of fabrication and assembly.

DETAILED DESCRIPTION OF THE PREFERRED EMBODIMENTS

Figure 1:
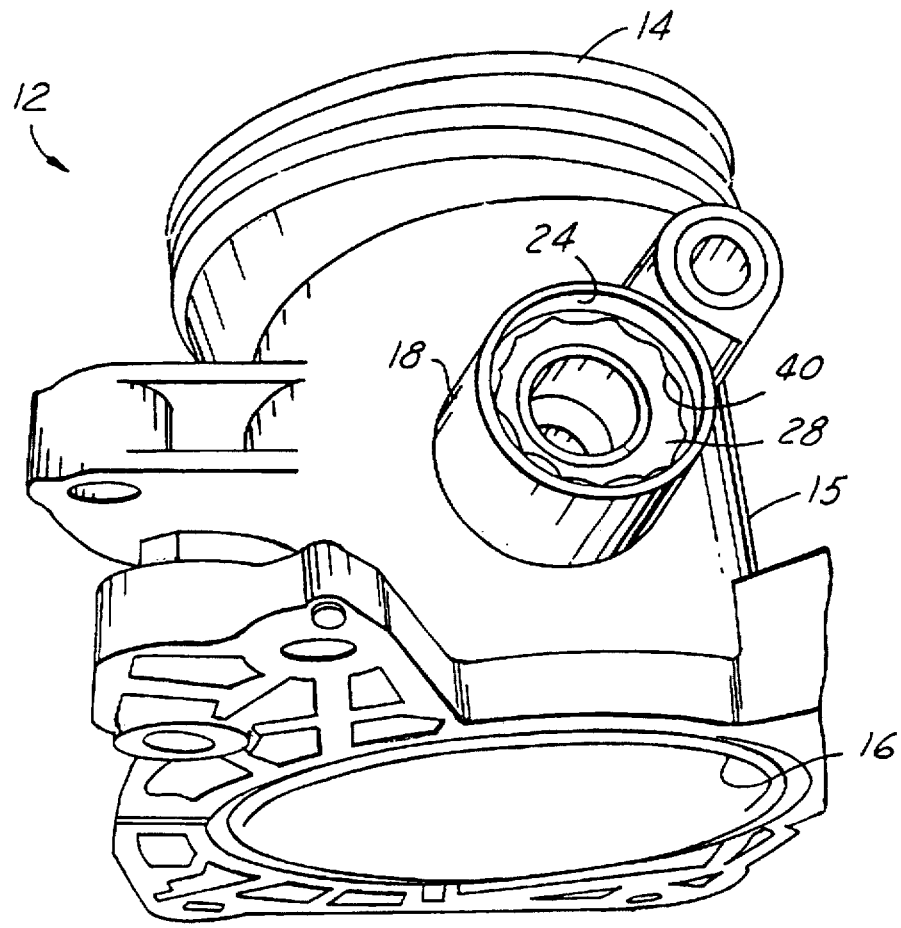
FIG. 1 is a perspective view of a portion of a throttle body, in accordance with the present invention.
Figure 2:
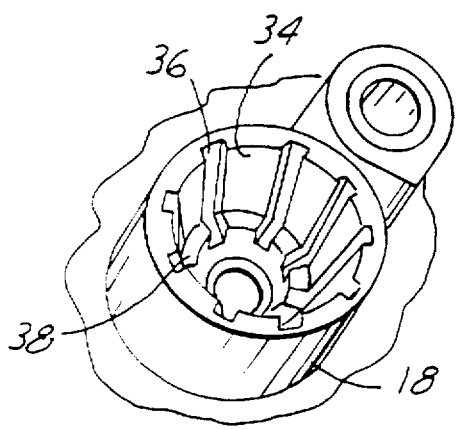
FIG. 2 is a perspective view of a portion of a throttle body, illustrated before the bearing is inserted and secured, in accordance with the present invention.
Figure 3:
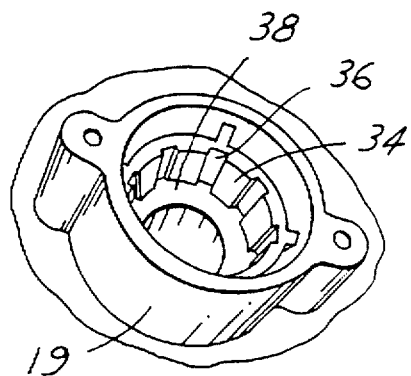
FIG. 3 is a perspective view of a portion of a throttle body similar to FIG. 2 illustrating a portion of the opposite side of the throttle body.

FIGS. 1-5 illustrate a throttle body 12 for use in an automotive vehicle intake system, not shown. The throttle body 12 includes a housing 14, preferably made of a molded composite plastic, with the plastic being a thermoplastic, rather than a conventional throttle body housing being made of metal. The housing 14 includes a typical main wall 15 defining a cylindrical shaped main bore 16 through which the airflow to an engine is controlled.

A pair of throttle shaft support bosses 18, 19 extend from opposite sides of and are oriented generally normal to the axis of the main bore 16. These bosses 18, 19 are preferably molded integrally as part of the housing 14. The bosses 18, 19 each include a throughbore 20, 21, respectively, through which a throttle shaft 22 will be inserted. Extending from the throughbores 20, 21 are a pair of throttle shaft bearing pockets 24, 26, respectively. The first bearing pocket 24 is primarily sized and shaped to receive a first throttle shaft support bearing 28, while the second bearing pocket 26 is sized and shaped to receive a second throttle shaft support bearing 30, and also a surrounding larger pocket 32. The larger pocket 32 receives a conventional throttle position sensor, not shown. The support bearings 28, 30 are conventional sealed bearings for this design. While the discussion herein uses the term bearings, bushings can of course be employed instead of bearings in the present invention, and references herein to bearings are meant to include bushings as well.

Being molded as part of the housing 14, the throttle shaft bearing pockets 24, 26 are sized and shaped to allow for both accurate location of the bearings 28, 30 and secure retention. Each pocket 24, 26 is formed by a generally cylindrical wall 34, with a number of axial grooves 36 extending along and recessed into each wall 34. There are also stop ring portions 38 of the pockets 24, 26 which have a smaller diameter that the walls 34. Since the throttle body housing 14 is molded from plastic, both the grooves 36 and the stop rings 38 can be molded along with the rest of the housing features, thus not requiring a separate operation while allowing for consistently accurate location of the pockets 24, 26 relative to the rest of the housing 14.

The nominal diameter of the bearings 28, 30 is slightly larger than the nominal diameter of the cylindrical walls 34 of the pockets 24, 26. Consequently, when each of the bearings 28, 30 is inserted into its respective pocket 24, 26, there will be a force fit between them. In this way, there is no play between the outer race of the bearings 28, 30 and their associated pockets 24, 26. This assures a precise radial location of the bearings 28, 30, and consequently the throttle shaft 22, relative to the housing 14. Also, when the bearings 28, 30 are inserted into their respective pockets 24, 26, each is inserted until it abuts its corresponding stop ring 38. In this way, the appropriate axial location of each bearing 28, 30 is assured.

For a conventional metal throttle body, the interference fit of the bearings may be sufficient, however, with a plastic throttle body housing 14 as in the present invention, fatigue and creep in the plastic around the location of press fit of the bearings 28, 30 will allow the bearings 28, 30 over time to loosen, allowing the original precise location to be lost and maybe even allowing the bearings to slide out of their pockets.

Figure 4:
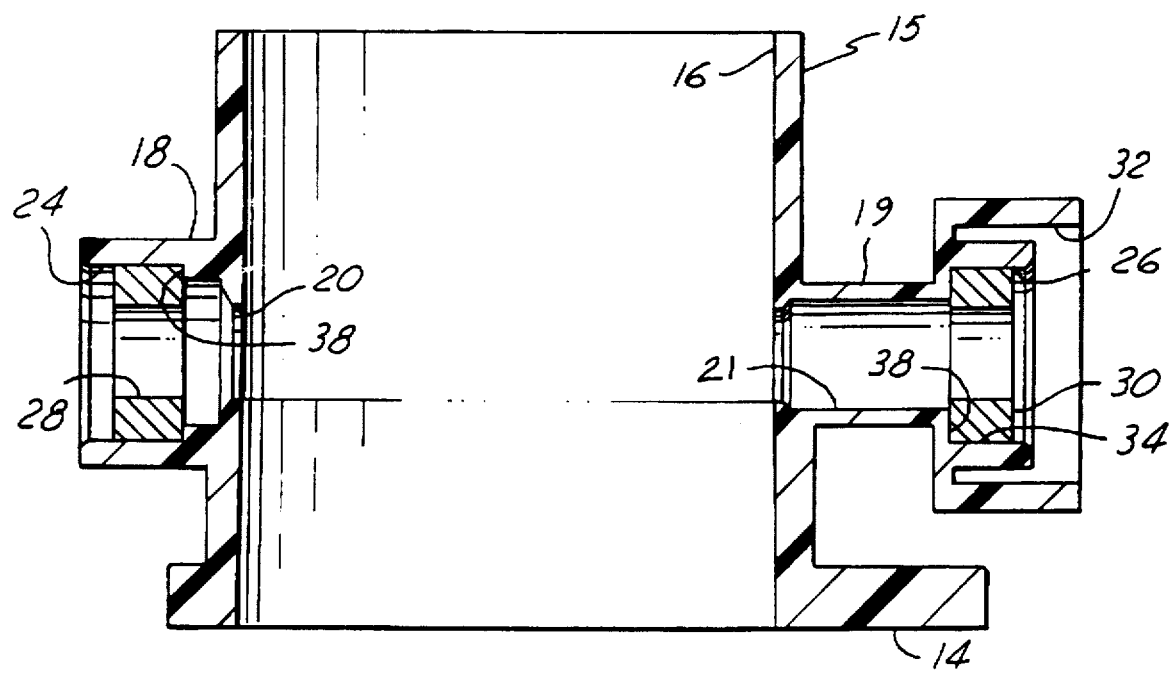
FIG. 4 is a sectional view of a portion of the throttle body of the present invention, with bearings inserted, but not secured in place.
Figure 5:
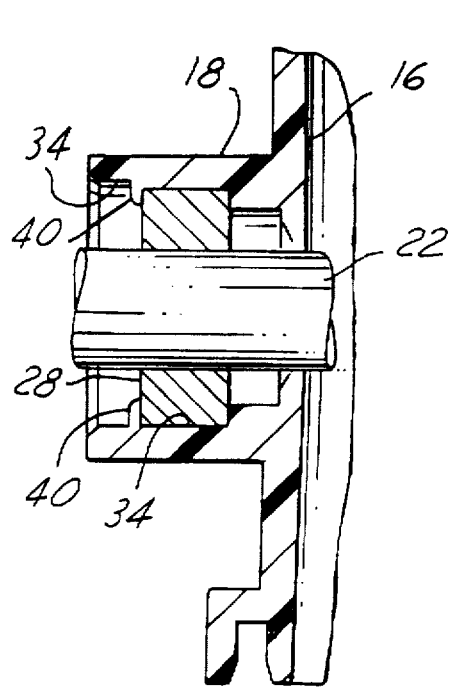
FIG. 5 is an enlarged view of a portion of FIG. 4 with the bearing secured in place, and illustrating a portion of a throttle shaft mounted in the bearing.
Figure 6:
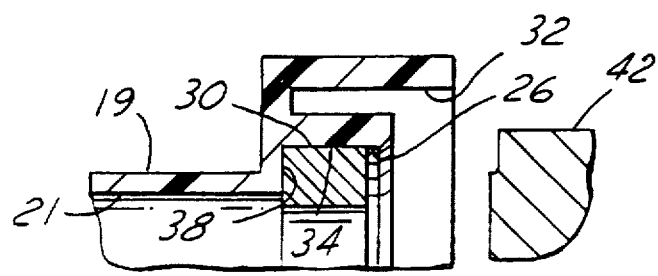
FIG. 6 is a sectional view of a portion of the throttle body and bearing, and illustrating a tool prior to securing the bearing, in accordance with the present invention.
Figure 7:
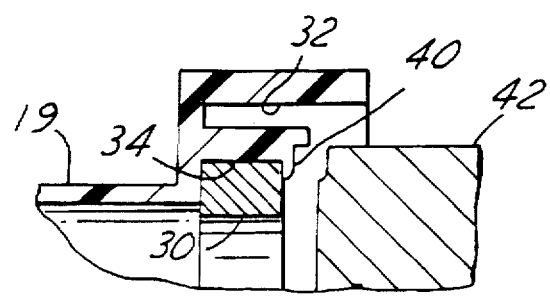
FIG. 7 is a sectional view similar to FIG. 6, illustrating the bearing after being secured in place by the tool.

In light of this, the pockets 24, 26 are configured to allow for a swaging process to easily take place. FIGS. 4 and 5 illustrate the first pocket 24 and bearing 28 before and after swaging, respectively; FIGS. 6 and 7 illustrate the second bearing pocket 26 and bearing 30 before and after swaging, respectively. Swaging is a method that uses a contoured tool 42 that reforms the thermoplastic material, thus capturing an insert placed within a molded thermoplastic part; in this case bearings. The material is displaced using either an ultrasonic, heated or cold swaging tool, depending upon the type of thermoplastic selected for the housing 14.

After the particular bearing, first 28 or second 30 as the case may be, is press fit into place, then a swaging tool 42 is brought to bear on the wall 34 of the particular pocket, 24 or 26. The swaging tool 42 is sized of a diameter to contact the portions of the wall 34 between the grooves 36. This is the material that is formed. As the material is acted upon, through ultrasonics or heat, or though shear force if cold forming, the material is pushed down on top of the exposed side of the particular bearing, forming retention lips 40 that permanently secure the bearings in the proper location. The plastic retention lips 40 formed around the bearings 28, 30 by the swaging process are controlled by the contour of the pockets prior to the swaging process.

With swaging, no additional parts are required, and the swaging process, while securing the outer races of the bearings 28, 30 in place, will not interfere with the operation of the inner races of the bearings 28, 30. The swaging of the throttle bearing pockets after insertion of the bearings in the pockets provides a positive bearing retention for the life of the vehicle, even in the harsh underhood engine environment of a vehicle.

Having the grooves 36 in the wall 34 allows for less force to be exerted to overcome the resistance of the wall 34 during the initial insertion of the particular bearing 28, 30 as well as reducing the amount of force required during the swaging process by controlling the total amount of swaged contact area (predetermined amount of displaceable thermoplastic) and nominal wall thickness. Although, one can forego the grooves 36, if so desired and accomplish the assembly, albeit with greater force required.

While certain embodiments of the present invention have been described in detail, those familiar with the art to which this invention relates will recognize various alternative designs and embodiments for practicing the invention as defined by the following claims.

We claim:

1. A throttle body comprising:
    a housing, formed of a thermoplastic type of material, including a main wall defining a main bore therethrough and a pair of bosses extending from the main wall and defining a throughbore therethrough;
    the bosses each including a bearing pocket adjacent the throughbore defined by a generally cylindrical pocket wall and a stop member extending radially inward into the corresponding pocket;
    a pair of bearings having generally cylindrical outer surfaces, one each mounted in a respective one of the bearing pockets and abutting a respective one of the stop members; and
    each of the pockets including retention lips extending from and being integral with the wall about a portion of the respective bearing opposite the side of the bearing abutting the stop member.

2. The throttle body of claim 1 wherein each of the cylindrical walls are a nominal diameter and the cylindrical outer surfaces are a nominal diameter larger than the respective nominal diameter of the cylindrical walls, whereby each of the bearings is press fit into the corresponding bearing pocket.

3. The throttle body of claim 2 wherein the wall of each bearing pocket includes a plurality of spaced axial grooves extending along and recessed into the wall.

4. The throttle body of claim 1 wherein the wall of each bearing pocket includes a plurality of spaced axial grooves extending along and recessed into the wall.

5. The throttle body of claim 1 wherein the stop members are shaped to form a cylindrical ring of smaller diameter than the pocket walls.

6. The throttle body of claim 1 further including a larger pocket, adapted to receive a throttle position sensor which is formed integrally with and surrounds one of the bearing pockets.

7. A throttle body comprising:
    a housing, formed of a thermoplastic type of material, including a main wall defining a main bore therethrough and a pair of bosses extending from the main wall and defining a throughbore therethrough;
    the bosses each including a bearing pocket adjacent the throughbore defined by a generally cylindrical pocket wall and a stop member extending radially inward into the corresponding pocket, with the wall of each bearing pocket including a plurality of spaced axial grooves extending along and recessed into the wall;

a pair of bearings having generally cylindrical outer surfaces, one each mounted in a respective one of the bearing pockets and abutting a respective one of the stop members; and each of the pockets including retention lips extending from and being integral with the wall about a portion of the respective bearing opposite the side of the bearing abutting the stop member.

8. The throttle body of claim 7 wherein each of the cylindrical walls are a nominal diameter and the cylindrical outer surfaces are a nominal diameter larger than the respective nominal diameter of the cylindrical walls, whereby each of the bearings is press fit into the corresponding bearing pocket.

* * * * *